United States Patent

Magnusson

[11] Patent Number: 6,144,518
[45] Date of Patent: Nov. 7, 2000

[54] PREPARATION AND USAGE OF DUAL-SCAN MASTER CALIBRATION TAPE FOR MAGNETIC TAPE DRIVE

[75] Inventor: Steven L. Magnusson, Boulder, Colo.

[73] Assignee: Exabyte Corporation, Boulder, Colo.

[21] Appl. No.: 08/841,579

[22] Filed: Apr. 30, 1997

[51] Int. Cl.$^7$ .................................................. G11B 5/584
[52] U.S. Cl. .......................................... 360/77.13; 360/75
[58] Field of Search .......................... 360/71, 53, 31, 360/75, 77.01, 77.12, 77.13, 130.23; 226/174, 9

[56] References Cited

U.S. PATENT DOCUMENTS

| | | | |
|---|---|---|---|
| 4,470,079 | 9/1984 | Tsuruta | 360/77.13 X |
| 4,520,410 | 5/1985 | Sekiguchi et al. | 360/77.13 |
| 4,590,523 | 5/1986 | Honjo et al. | 360/77.13 X |
| 4,685,013 | 8/1987 | Joannou et al. | 360/125 |
| 5,027,231 | 6/1991 | Fell | 360/71 |
| 5,119,246 | 6/1992 | Tomitaka | 360/77.13 X |
| 5,177,647 | 1/1993 | Takayanagi | 360/77.13 X |
| 5,243,473 | 9/1993 | Lee | 360/77.13 X |
| 5,365,333 | 11/1994 | Wirth et al. | 356/244 |
| 5,546,247 | 8/1996 | Fujioka et al. | 360/77.13 |
| 5,771,132 | 6/1998 | Hirohata et al. | 360/77.13 |
| 5,822,491 | 10/1998 | Sasaki et al. | 360/77.01 X |

FOREIGN PATENT DOCUMENTS

WO 95/13615  5/1995  WIPO.

*Primary Examiner*—Andrew L. Sniezek
*Attorney, Agent, or Firm*—Nixon & Vanderhye, P.C.

[57] ABSTRACT

A dual-scan master calibration tape is prepared and used for adjusting guide elements of a magnetic tape drive. The dual-scan master calibration tape is generated by transporting the master calibration tape past a rotating drum whereon a write head is mounted and activating the write head only during every other rotation of the drum. In use, the master calibration tape is transported past a read head in a manner whereby, for a track pre-recorded on the master calibration tape, the read head separately follows a first path over the track and a second path over the track. A first path read signal is generated as the read head follows the first path over the track; a second path read signal is generated as the read head follows the second path over the track. Both the first path read signal and the second path read signal are used to determine a calibration indicia for the tape drive.

4 Claims, 12 Drawing Sheets

Example of good alignment and good head-to-tape contact

Example of good alignment and poor head-to-tape contact

Example of poor alignment and good head-to-tape contact

Example of poor alignment and poor head-to-tape contact

Scanner Diameter = D = 46.9 mm
Native Scanner Rot Speed = N = 5661.2 RPM
Native Linear Tape Speed = $V_T$ = 25.43 mm/sec
Helix Angle = $\beta$ = 4.8871°
Recorded Track Angle = $\theta$ = 4.8960°

TRACKS RECORDED BY WRITE HEAD #1
TRACKS RECORDED BY WRITE HEAD #2

Write Head Width = W = .016 mm
Pitch = P = .023 mm
(other parameters same as above)

TRACKS RECORDED ONLY BY WRITE HEAD #1

Read Head Width = R = .0185 mm

Single-scan Method: Example of good alignment and good head-to-tape contact
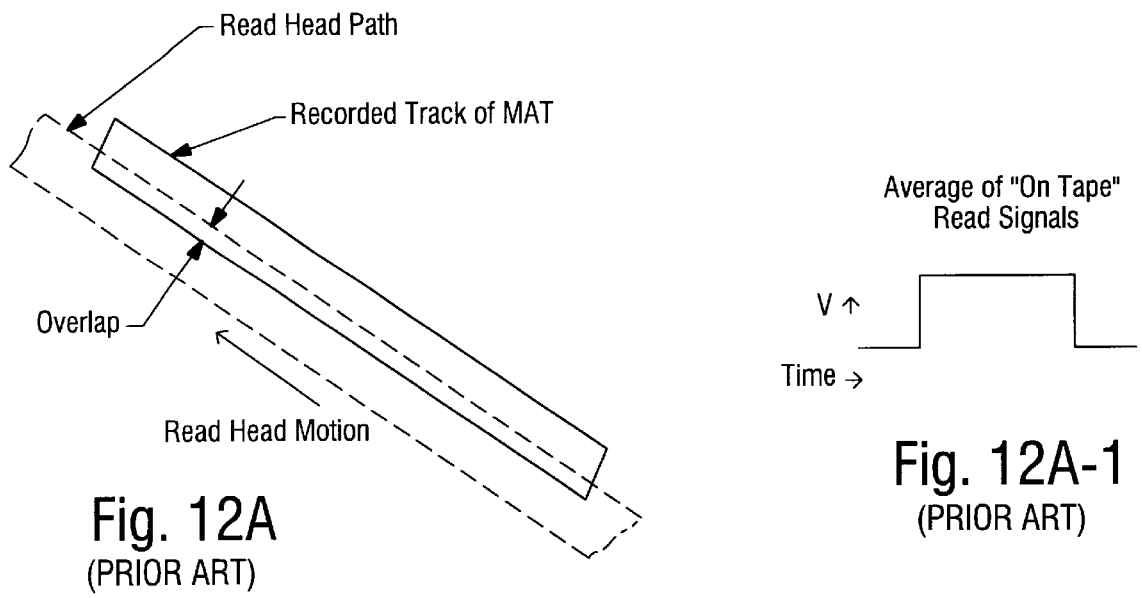
Fig. 12A
(PRIOR ART)
Fig. 12A-1
(PRIOR ART)
Single-scan Method: Example of good alignment and poor head-to-tape contact
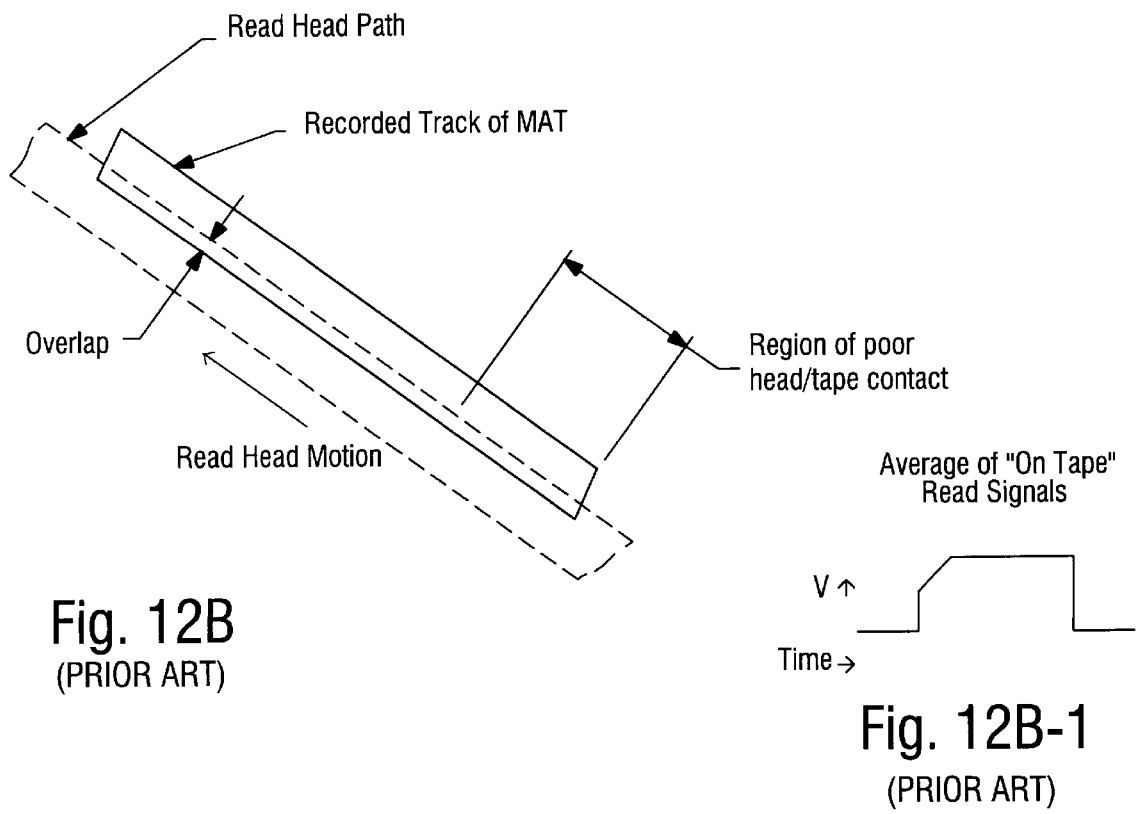
Fig. 12B
(PRIOR ART)
Fig. 12B-1
(PRIOR ART)

Single-scan Method: Example of poor alignment and good head-to-tape contact
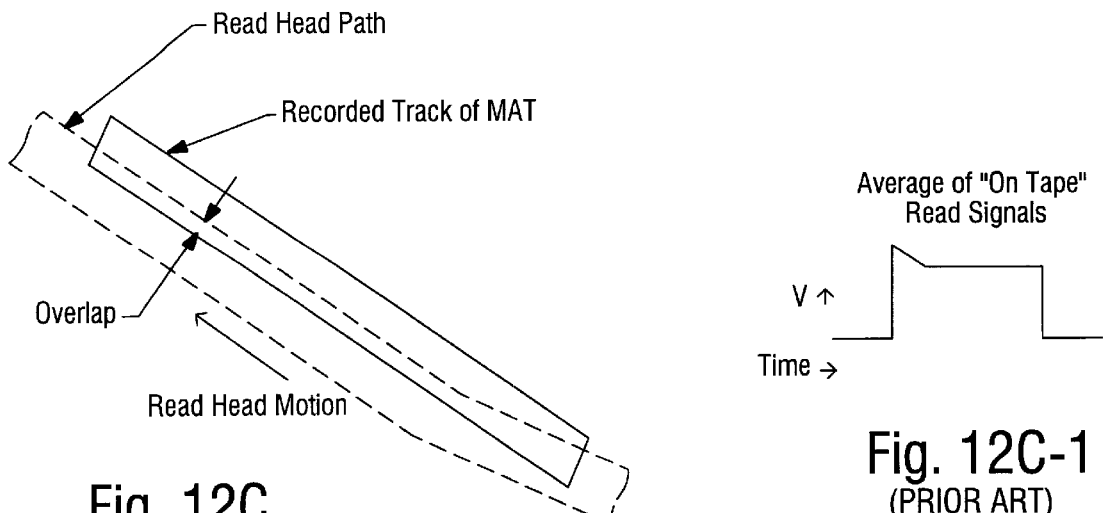
Fig. 12C
(PRIOR ART)
Fig. 12C-1
(PRIOR ART)
Single-scan Method: Example of poor alignment and poor head-to-tape contact
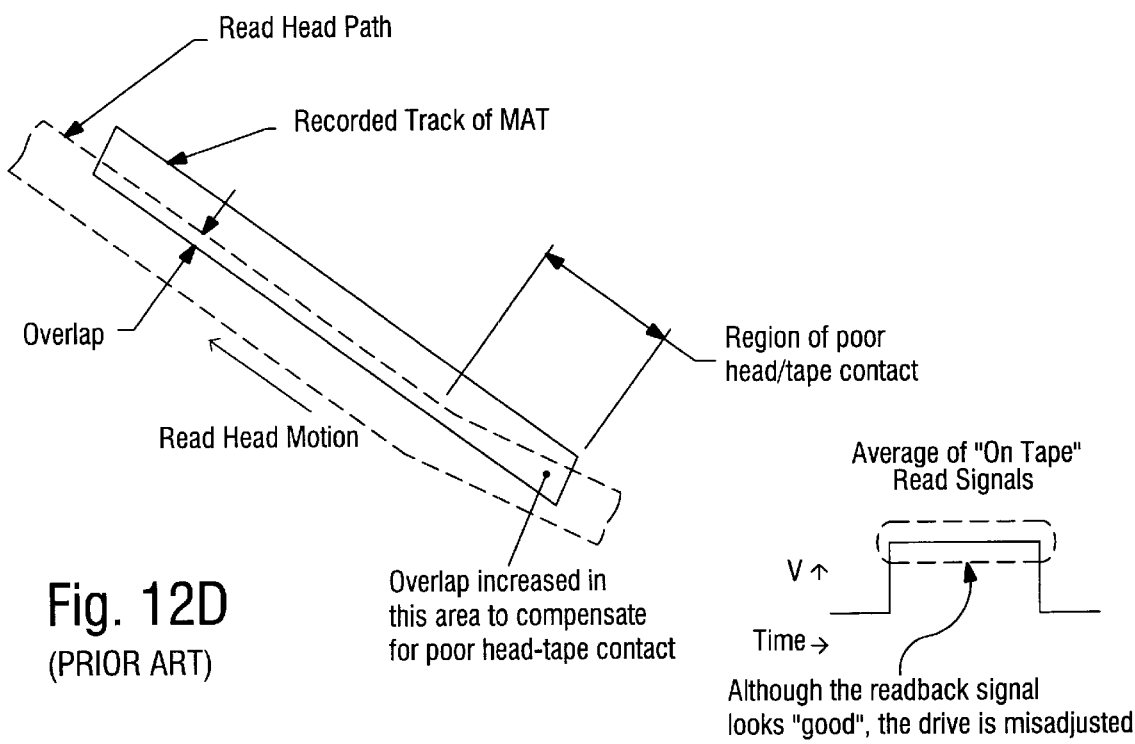
Fig. 12D
(PRIOR ART)
Although the readback signal looks "good", the drive is misadjusted
Fig. 12D-1
(PRIOR ART)

PREPARATION AND USAGE OF DUAL-SCAN MASTER CALIBRATION TAPE FOR MAGNETIC TAPE DRIVE

BACKGROUND

1. Field of Invention

This invention pertains to the calibration of magnetic tape drives.

2. Related Art and Other Considerations

In magnetic tape drives, magnetic tape is transported past a head unit whereon at least one, and usually both, of a write head and a read head are mounted. As the tape is transported past the head unit, the heads are employed to transduce information with respect to the tape. In a recording mode, the write head records tracks on the tape. Conversely, in a read or reproduction mode, tracks previously recorded on the tape are read.

Two types of magnetic tape drives are serpentine tape drives and helical scan tape drives. In serpentine tape drives, elongated tracks are recorded parallel to the direction of tape transport, e.g., along the major dimension of the tape, typically from a first end of the tape to a second end of the tape. In helical scan tape drives, the head unit is mounted on a rotating drum around which the tape is partially wrapped at a predetermined angle. In view of the geometry, helical tracks are stripes are recorded and read by the helical scan tape drive.

In magnetic tape drives, the tape is typically housed in a cartridge. In some tape drives, such as the helical scan drives, a portion of the tape is extracted from the cartridge into a tape path for operative encounter with the head unit. In other drives, upon opening of a cartridge lid or the like, a tape path is formed in which the head unit operatively encounters the tape. In either case, the tape path of the tape drive typically includes one or more tape guiding elements for properly guiding and aligning the tape as the tape is in transit toward the head unit.

A typical tape guide element 700 shown in FIG. 7A and FIG. 7B has the shape of a spool, Guide element 700 has upper and lower edge flanges 702, 704 and a rotating, barrel-like midsection 706, all concentrically positioned about a mounting pin 708. The top of mounting pin 708 is threaded for engagement with interior threads on upper edge flange 702. An expansion spring 710 is retained between a deck of the tape drive and an underside of lower edge flange 704.

Tape T is guided between upper flange 702 and lower flange 704 in the manner shown in FIG. 7A. To accommodate linear transport of tape T, guide midsection 706 rotates about bearing 712. Bearing 712 and edge flanges 702, 704 are movable along the vertical direction as depicted by arrow 720. However, the precise vertical position of guide member 700, and thus of tape T, is adjusted and retained by upper edge flange 702. By rotation of upper edge flange 702 about the threaded top end of mounting pin 708, the tape T can be set to a proper vertical height for feeding of tape T toward the head unit.

The vertical height for guide elements such as guide 700 of FIG. 7A must be calibrated for a tape drive, e.g., upon manufacture and for maintenance of the tape drive. To this end, tape drive manufacturers have long used "master alignment tapes" for the spatial adjustment of the tape guide elements of the tape path in order to locate the position of the tape relative to the head unit, e.g. the rotating drum or scanner in a helical scan recorder rotary head device. The master alignment tapes are prepared on a well-calibrated tape drive and then removed therefrom. The master alignment tape is then inserted into a tape drive to be adjusted, e.g., a just-manufactured tape drive, and read by the adjusted tape drive. From the readback signals of a master alignment tape acquired from the tested tape drive, the technician (or robot) makes the available spatial guide adjustments of the guide elements of the adjusted tape drive until a desired readback waveform is achieved (or nearly achieved).

The overall accuracy of the master alignment tape approach depends on how the master alignment tape is constructed and how it is used. In this regard, the spatial information about the relationship between the master alignment tape and the head unit is derived from the readback signal amplitudes. Any other factors causing fluctuations in readback signal amplitudes (i.e., inconsistent head-tape contact) may influence the results.

To date, tape drive manufacturers have used "single-scan" master alignment tapes. A "single-scan master alignment tape" for a helical scan drive has a series of tracks written by only one write head using the native (+1X) linear tape speed and drum RPM.

Typically, the relationship between the recorded track pattern of the single-scan master alignment tape and the tape edge is physically measured and verified on a separate metrology system (e.g. using Ferrofluid or Kerr effect optical techniques to detect the magnetic location of the recorded track relative to the reference edge of the tape (e.g. usually bottom edge).

Single-scan master alignment tapes are read only by one read head of a tape drive, even if the tape drive has a plurality of read heads. The read head which actually reads the master alignment tape is herein called the "activated" read head. Although only one read head is employed, single-scan master alignment tapes are produced in accordance with the number of heads normally utilized in the drive to be calibrated. For example, whereas FIG. 8A shows an example of a track pattern on a normal tape for a particular helical scan drive having two write heads and two read heads, FIG. 8B shows a single-scan master alignment tape for the same helical scan drive. As another example, a helical scan drive having four write heads and four read heads, and which conventionally is referenced as a D-2 525, typically transduces information to a tape having the track pattern shown in FIG. 9A, but uses a single-scan master alignment tape as shown in FIG. 9B.

As the name implies, in the "single-scan" method each track written on the master alignment tape is scanned only once by the corresponding read head of the tape drive undergoing adjustment. To eliminate read head width effects and recorded track width effects from the readback signal amplitude, the pattern of read head paths is intentionally offset so that each read head path only partially overlaps each track recorded on the master alignment tape. For the (two write head) helical scan drive which normally reads the track pattern illustrated in FIG. 8A, FIG. 8C shows the path of an activated one of its read heads over the single-scan master calibration tape of FIG. 8B. Similarly for the (four write head) helical scan drive which normally reads the track pattern illustrated in FIG. 9A, FIG. 9C shows the path of an activated one of its read heads over the single-scan master calibration tape of FIG. 9B.

Assuming that the head-tape contact is perfectly consistent throughout the read head scan, variation in the peak readback signal amplitude (during the on-tape scan) is directly related to the variation in the spatial overlap between the read head path and the recorded track of the master alignment tape. For example, FIG. 10 shows a typical voltage waveform from a read head (after peak detection) following a single-scan master alignment tape, assuming the ideal condition of a perfect single-scan master alignment tape being read by a perfectly matched tape drive with perfectly consistent head/tape contact throughout each read head scan. Typically, the voltage waveforms from many on-tape read scans are averaged together, as depicted in FIG. 11, to improve signal to noise ratio (SNR). In FIG. 11, the amplitude V represents an overlap of the read head pass over the written track assuming perfect head-to-tape contact.

Generally, the technician (or robot) adjusts the tape drive's tape guiding elements, e.g. as explained above, to minimize any variation in the peak readback signal amplitude. This necessarily implies that the read head path shape matches the recorded track shape of the master alignment tape. However, as track densities have increased, it has become more difficult to make "perfect" master alignment tapes. Therefore, since the master alignment tape has been previously measured on a separate metrology system, the technician can also be instructed to intentionally achieve a certain amount (and shape) of peak readback signal amplitude variation that would compensate for the known errors of the master alignment tape for an "electrical" compensation for the master alignment tape error can be added by the voltage measurement system). In either case, the technician works to a fixed peak readback signal amplitude/shape target that assumes that the head-tape contact is perfectly consistent though out the read head scan and that the peak readback signal is directly related to the physical overlap of read head scan over the recorded track of the master alignment tape.

If the read head-to-tape contact is not perfectly consistent through out the scan, the single-scan method will result in a misadjustment of the tape drive in order to compensate for the poor head-tape contact. For example, if poor head-tape contact results in a loss of peak readback signal amplitude only near the start of scan region, as in the case shown in FIGS. 12D and 12D–1, the drive will be adjusted so that the read head path overlaps more of the recorded track in this area to compensate for the signal loss due to poor head-tape contact. Although the desired peak readback signal amplitude/shape is achieved, the drive's spatial alignment does not match the master alignment tape since the overlap is not consistent.

What is needed therefore, and an object of the present invention, is a master alignment tape and method of using the same for accurate and efficient adjustment.

SUMMARY

A dual-scan master calibration tape is prepared used for adjusting guide elements of a magnetic tape drive. The dual-scan master calibration tape is generated by transporting the master calibration tape past a rotating drum whereon a write head is mounted and activating the write head only during every other rotation of the drum. Tracks of flux transitions are thus recorded on the master calibration tape. In use, the master calibration tape is transported past a read head in a manner whereby, for a track pre-recorded on the master calibration tape, the read head separately follows a first path over the track and a second path over the same track. A first path read signal is generated as the read head follows the first path over the track; a second path read signal is generated as the read head follows the second path over the track. Both the first path read signal and the second path read signal are used to determine a calibration indicia for the tape drive. The first path over the track preferably occurs over a first longitudinal edge of the track and the second path over the track preferably occurs over a second longitudinal edge of the track. In some embodiments, the dual master calibration tape is written at a non-native linear tape speed and is transported past the read head at a non-native linear tape speed.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIGS. 12A and 12A–1 show a signal waveform using a single-scan master alignment tape for a case of good alignment and good head-to-tape contact.

FIGS. 12B and 12B–1 show a signal waveform using a single-scan master alignment tape for a case of good alignment and poor head-to-tape contact.

FIGS. 12C and 1C–1 show a signal waveform using a single-scan master alignment tape for a case of poor alignment and good head-to-tape contact.

FIGS. 12D and 12D–1 show a signal waveform using a single-scan master alignment tape for a case of poor alignment and poor head-to-tape contact.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

In accordance with the present invention, a master alignment tape is prepared such that the pattern of read head paths scans or traverses each recorded track of the master alignment tape twice. The first scan or traversal is partially overlapped down one side of the recorded track, and then a second scan or traversal is partially overlapped on the other side of the same recorded track.

Thus, in accordance with the present invention, for a helical scan drive, a single write head used to record the master alignment tape is activated every other scanner (i.e. drum) revolution rather than every scanner revolution.

Moreover, for some embodiments, a different linear tape speed (other than the native +1X linear tape speed) may be required for both recording and reading the master alignment tape so that the read head scans each written track on the master alignment tape twice as described above.

Figure 1A:
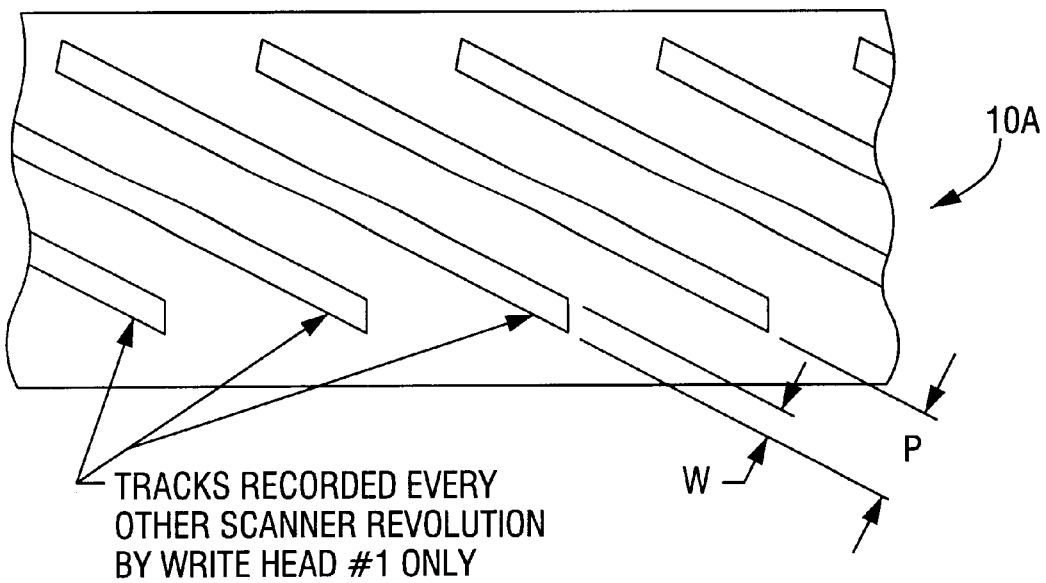
FIG. 1A is a diagrammatic view of a master calibration tape format for a second tape drive according to the present invention.
Figure 1B:
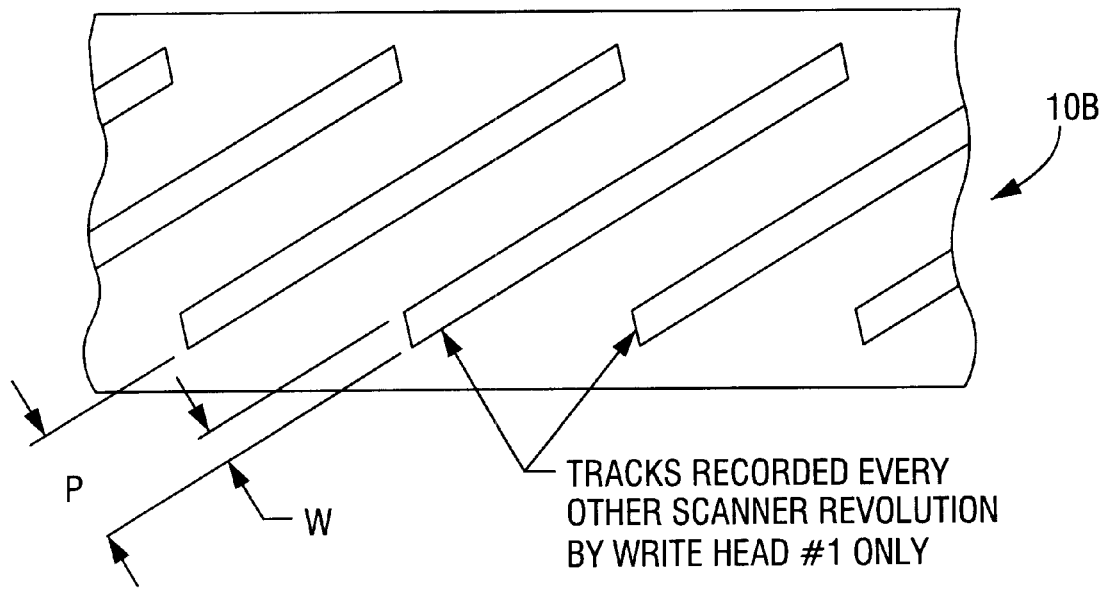
FIG. 1B is a diagrammatic view of a dual scan calibration tape format for a second tape drive according to the present invention.
Figure 8A:
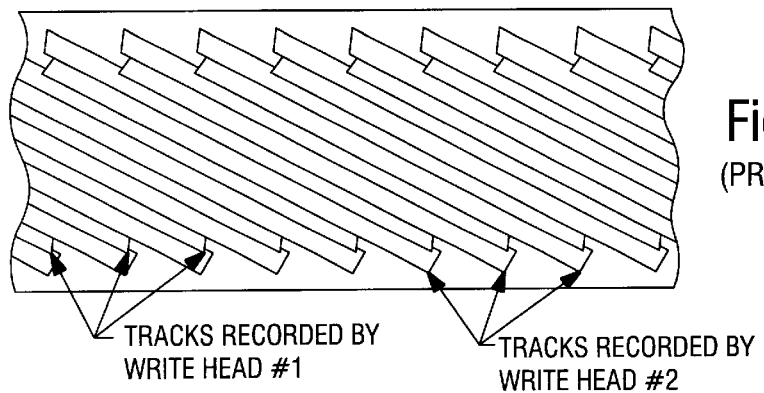
FIG. 8A is a diagrammatic view of a track pattern on a normal tape for a helical scan drive having two write heads and two read heads.
Figure 8B:
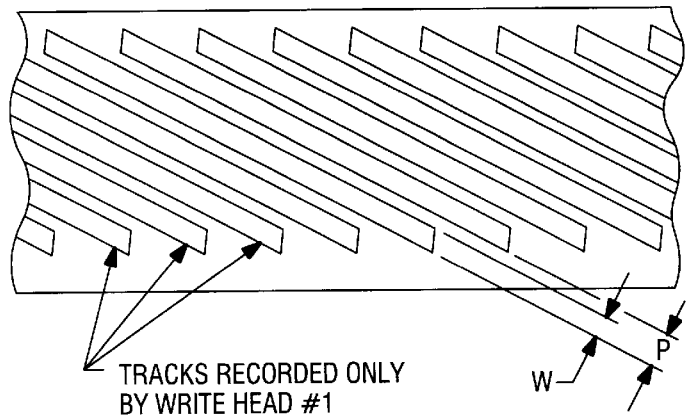
FIG. 8B is a diagrammatic view of a track pattern on a single-scan master alignment tape for the helical scan drive which reads the normal tape of FIG. 8A.
Figure 8C:
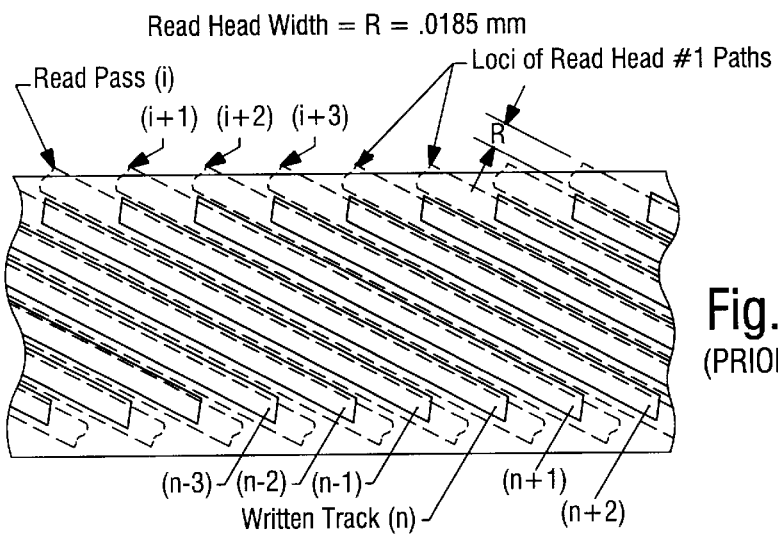
FIG. 8C is a diagrammatic view showing a path of an activated read head over the single-scan master alignment tape of FIG. 8B.

Examples of master alignment or calibration tapes 10A, 10B of the present invention, denominated as "dual-scan alignment tapes, are shown in FIG. 1A and FIG. 1B, respectively. Calibration tape 10A of FIG. 1A is utilized for the same helical scan drive which normally reads the track pattern shown in FIG. 8A, and which is described in more detail hereinafter in connection with FIG. 5 and FIG. 6. Calibration tape 10B of FIG. 1B is utilized for the same helical scan drive which normally reads the track pattern shown in 9A.

Calibration tapes 10A and 10B have tracks which are recorded to have a predetermined width W and predetermined pitch P. Values for the width W and pitch P for tapes 10A and 10B, along with other parameters for the tapes and tape drives which record the same, are shown in TABLE 1.

TABLE 1

| parameter | tape 10A | tape 10B |
| --- | --- | --- |
| scanner diameter (D) | 46.9 mm | 96.494 mm |
| native scanner rotational speed (N) | 5661.2 RPM | 5994 RPM |
| new tape speed | 25.43 mm/sec | 59.6 mm/sec |
|  | ($V_T' = V_T$) | ($V_T' \neq V_T$) |
| helix angle ($\beta$) | 4.8871° | 6.1592° |
| recorded track angle ($\theta' = \theta$) | 4.8960° | 6.1458° |
| write head width (W) | .016 mm | .043 mm |
| pitch (P) | .046 mm | .0710 mm |

The master alignment tapes of the invention thus have a series of tracks written by only one write head using a newly selected linear tape speed, $V_T'$, (which may or may not be equal to the native +1X linear tape speed, $V_T$) and the nominal (+1X) scanner RPM. The sole activated write head records one track every other scanner revolution.

Figure 2A:
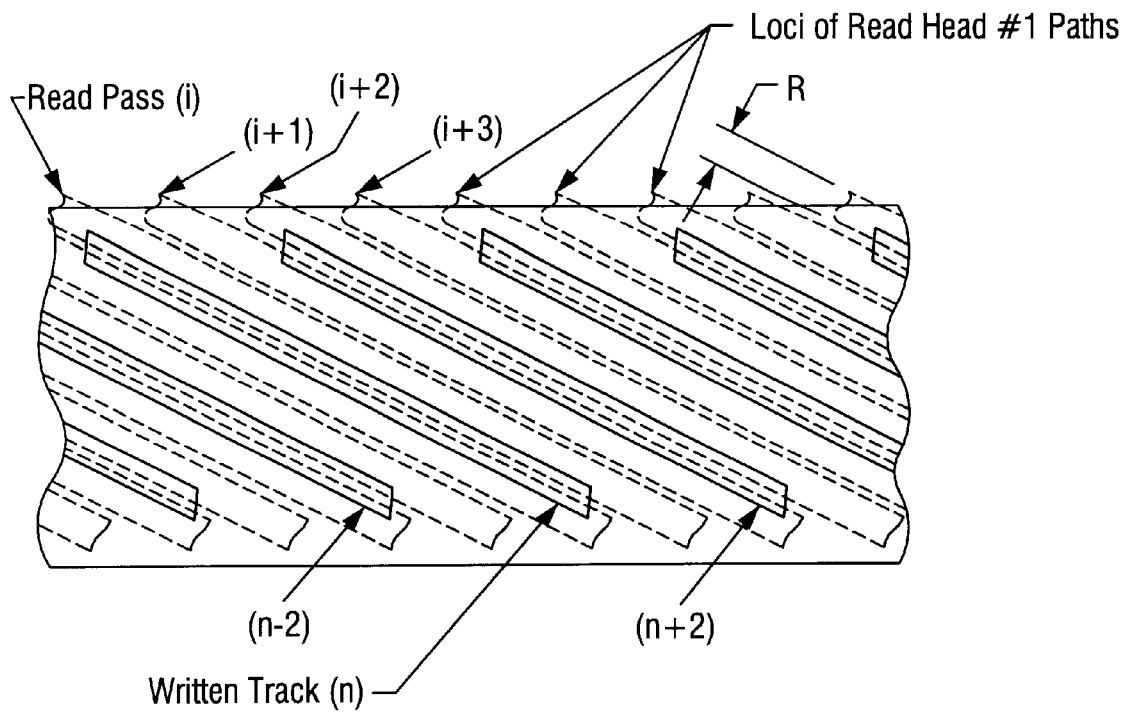
FIG. 2A shows paths traversed by an activated read head of drive in relation to the calibration tape of FIG. 1A.
Figure 2B:
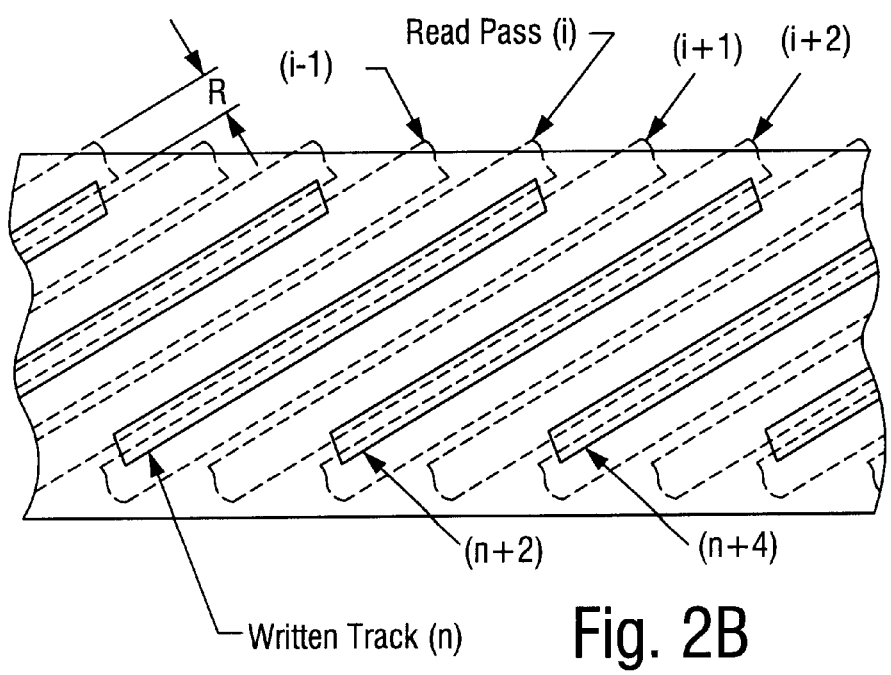
FIG. 2B shows paths traversed by an activated read head of drive in relation to the calibration tape of FIG. 1B.

FIG. 2A and FIG. 2B show the paths traversed by an activated read head in relation to calibration tapes 10A and 10B. In FIG. 2A and FIG. 2B, the paths traversed by the activated read heads are shown in broken lines, the tracks of calibration tapes 10A, 10B are shown in solid lines.

Figure 3:
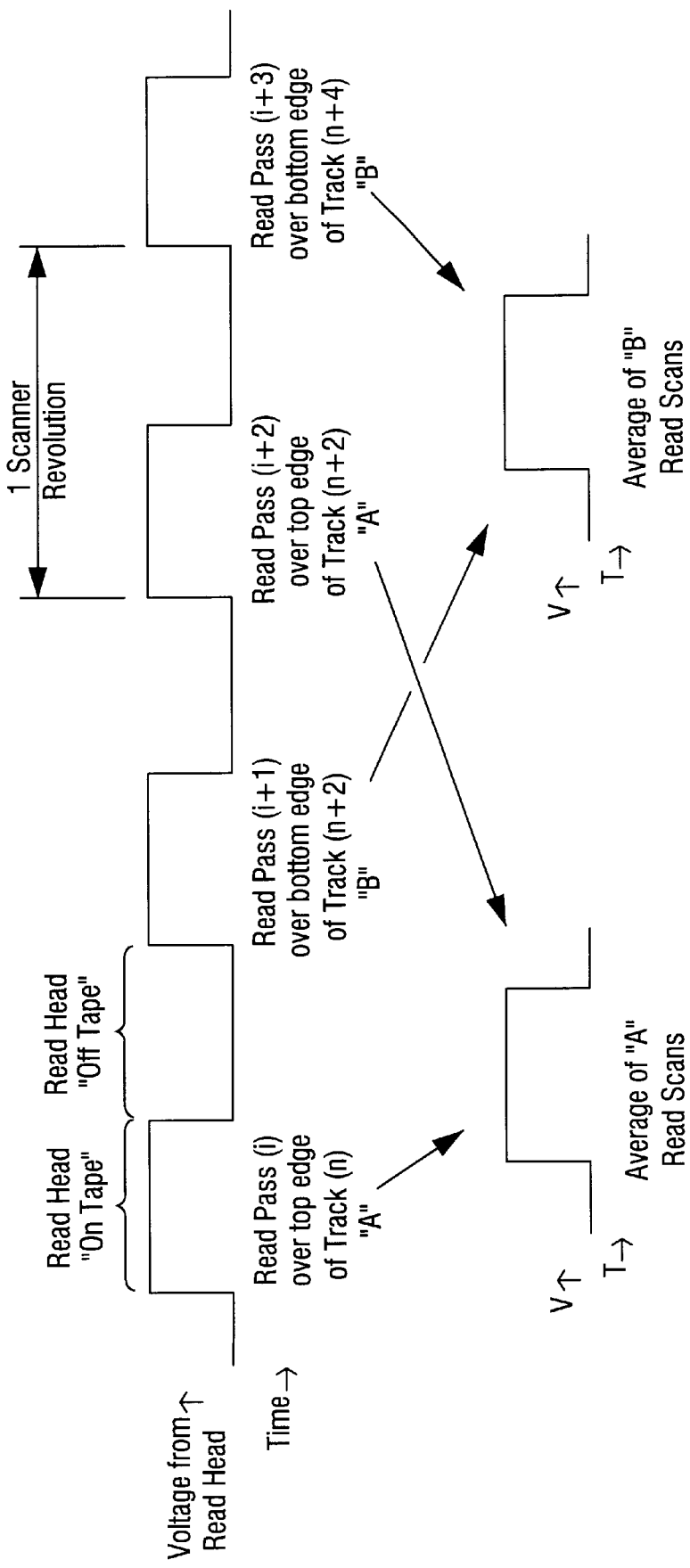
FIG. 3 shows a waveform signal generated upon reading of a calibration tape of the invention.

FIG. 3 shows a voltage waveform, generated upon reading either of the master calibration tapes shown in FIG. 2A or FIG. 2B. The waveform of FIG. 3 includes an alternating pattern of "A" scans, where the read head is partially overlapped on the top of the recorded track, and "B" scans, where the read head is partially overlapped on the bottom of the same recorded track. As also shown in FIG. 3, many "A" waveforms are averaged together and many "B" waveforms are averaged together to reduce "noise" influences and improve the SNR of the measurement. Any alignment difference between the tape drive and master alignment tapes 10A, 10B that would cause more overlap and an increase in a portion of the "A" waveform also causes a corresponding signal decrease in the same portion of the "B" waveform (and vice versa). The "alignment" of the tape drive relative to the master alignment tape 10A and 10B is defined as (A–B). The vertical heights of the tape guide elements are adjusted to obtain a desired target shape/amplitude for this signal.

Figure 5:
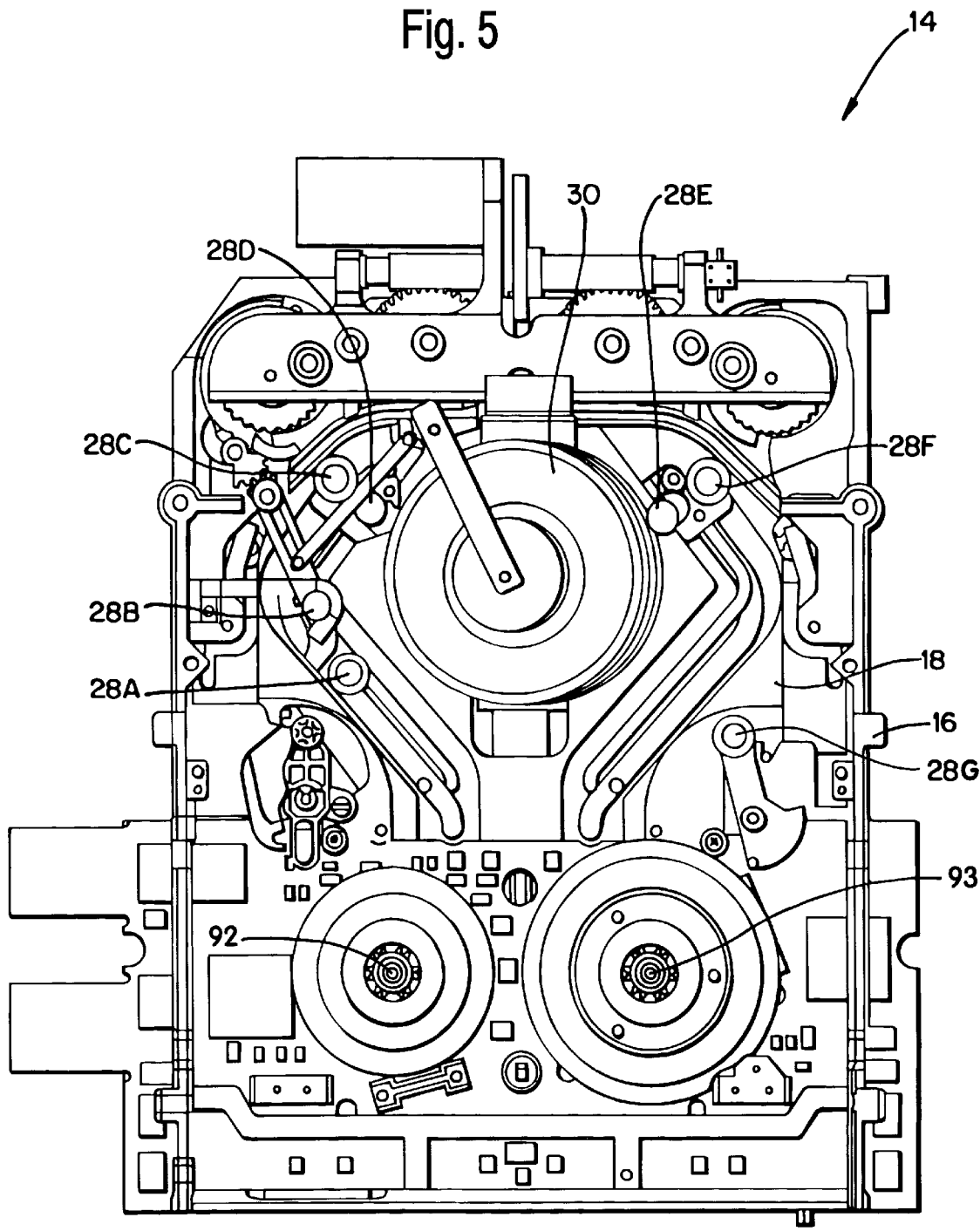
FIG. 5 is a top view of a tape drive.

FIG. 5 schematically shows a helical scan tape drive 14 which can depict either a calibrated drive which produces the master calibration or alignment tape 10A of the present invention, or a drive which is to be calibrated or adjusted using the master calibration or alignment tape 10A of the present invention.

Figure 6:
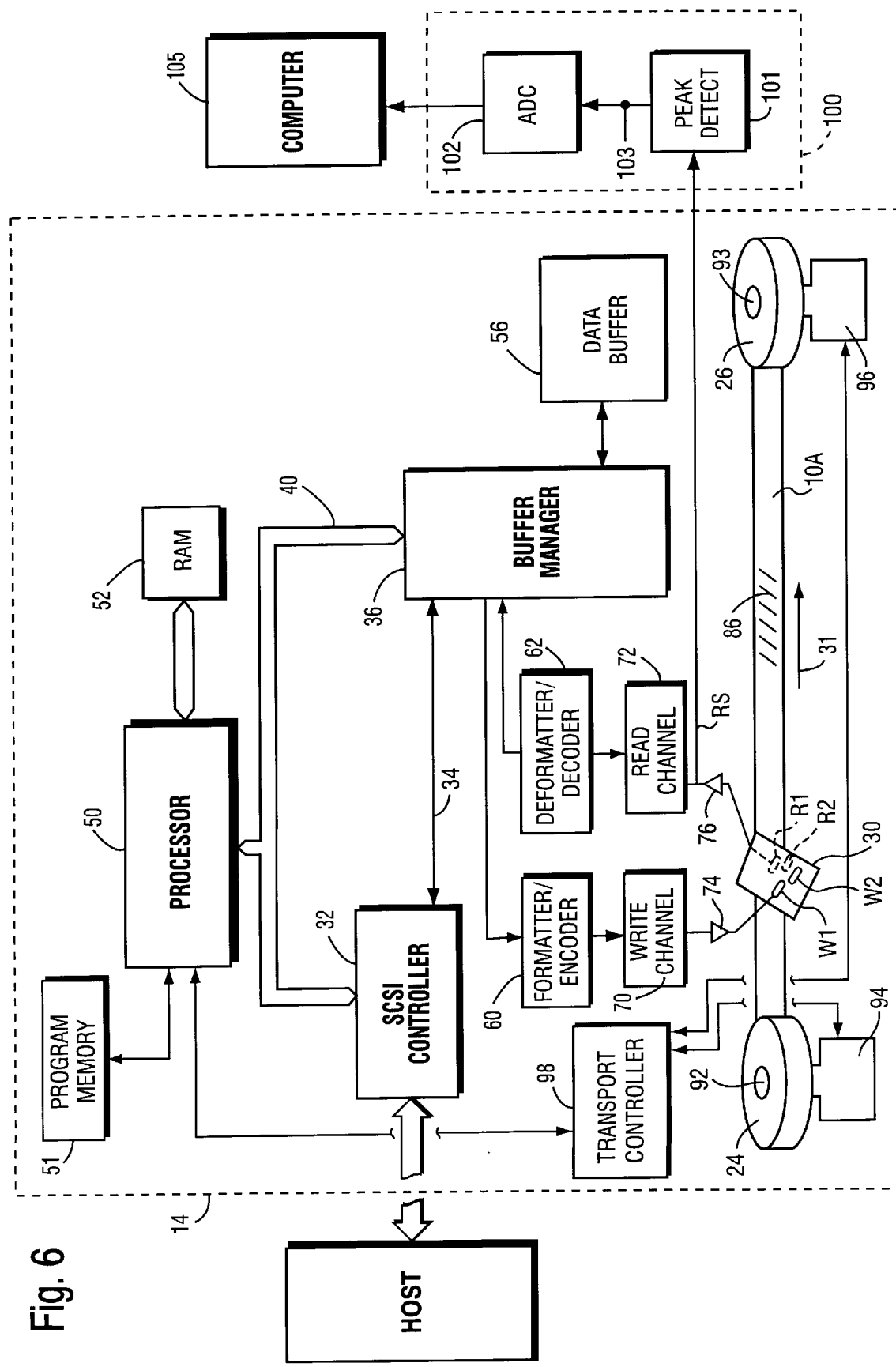
FIG. 6 is a schematic view of electronics included in the tape drive of FIG. 5.
Figure 7B:
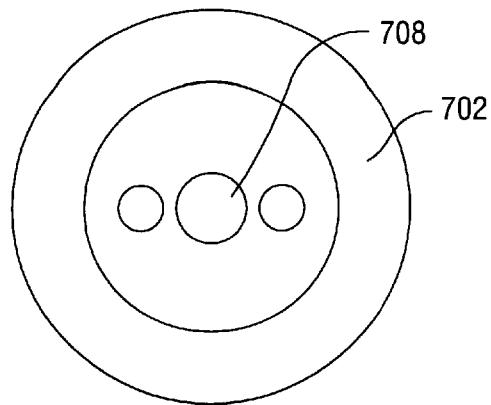
FIG. 7B is a top view of the guide element of FIG. 7A.
Figure 7A:
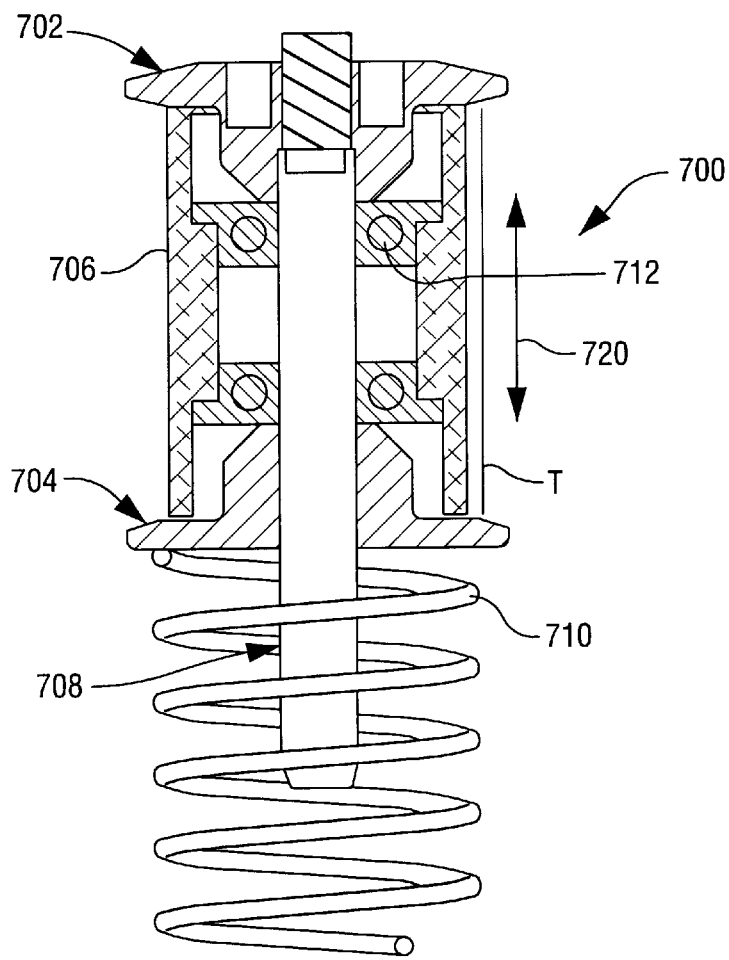
FIG. 7A is a cross-sectional side view of a guide element for a tape drive.

Helical scan drive 14 includes a drive frame 16 and a deck floor 18. As shown in FIG. 6, a magnetic tape (such as an 8 mm magnetic tape, for example) has a first end wound around a supply reel 24 and a second end wound around a take-up reel 26. The path traversed by the tape is defined at least in part by a series of tape guide elements 28A–28G and a rotating scanner or drum 30. Tape guides 28 and drum 30 are ultimately mounted on deck floor 18. In all operations excepting a rewind operation, the tape travels from supply reel 24 to take-up reel 26 in the direction depicted by arrow 31.

As shown in FIG. 6, drum 30 has read heads R1 and R2 as well as write heads W1 and W2 mounted on the circumference thereof. As drum 30 rotates, at any moment a portion of its circumference is in contact with traveling tape. Other structural details of tape drive 14 are understood e.g., from U.S. Pat. No. 5,602,694 to Miles et al., which is incorporated herein by reference.

Tape drive 14 includes a SCSI controller 32 which is connected by data bus 34 to buffer manager 36. Both SCSI controller 32 and buffer manager are connected by a bus system 40 to processor 50. Processor 50 is also connected to program memory 51 and to a data memory, particularly RAM 52.

Buffer manager 36 controls, e.g., both storage of user data in buffer memory 56 and retrieval of user data from buffer memory 56. User data is data from a host for recording on tape or destined from tape to the host. Buffer manager 36 is also connected to formatter/encoder 60 and to deformatter/decoder 62. Formatter/encoder 60 and deformatter/decoder 62 are, in turn, respectively connected to write channel 70 and read channel 72. Write channel 70 is connected via write amplifier 74 to recording element(s) or write head(s) W1, W2; read channel is connected via read amplifier 76 to read element(s) or read head(s) R1, R2.

Those skilled in the art will appreciate that write channel 70 includes various circuits and elements including a RLL modulator, a parallel-to-serial converter, and write current modulator. Similarly, the person skilled in the art understands that read channel 72 includes a data pattern and clock recovery circuitry, a serial-to-parallel converter, and, an RLL demodulator. These and other aspects of tape drive 30, including servoing, error correction, are not necessary for an understanding of the invention and accordingly are not specifically described herein.

Write head(s) W1, W2 and read head(s) R1, R2 are situated on a peripheral surface of rotating drum 30. Tape 10A is wrapped around drum 30 such that head(s) W1, W2 and R1, R2 follow helical stripes 86 on tape 10A as tape 10A is transported in a direction indicated by arrow 31 from a supply reel 24 to a take-up reel 26. Supply reel 24 and take-up reel 26 are typically housed in an unillustrated cartridge or cassette from which tape 10A is extracted into a tape path that includes wrapping around drum 30. Supply reel 24 and take-up reel 26 are driven by respective reel spindles 92, 93 which are rotated by respective reel motors 94 and 96 for transport tape 10A in the direction 31. Reel motors 94 and 96 are controlled by transport controller 98, which ultimately is governed by processor 50. Operation and control of the tape transport mechanism including reel motors 94 and 96 is understood by the person skilled in the art with reference, for example, to U.S. patent application Ser. No. 08/337,620 for METHOD AND APPARATUS FOR CONTROLLING MEDIA LINEAR SPEED IN A HELICAL SCAN RECORDER, filed Nov. 10, 1994 and incorporated herein by reference.

To generate the dual-scan master calibration tape 10A of the invention, processor 50 executes a sequence of operations in which flux transitions are recorded only on every other stripe of the master calibration tape 10A. In this regard, a single write head used to record the master alignment tape is activated every other scanner (i.e. drum) revolution rather than every scanner revolution. As one example of such sequence of operations, data buffer 56 has data stored at a particular location. Rotations of drum 30 are sensed by a tachometer or the like. Only one write head, e.g, write head W1, is utilized. Write head W2 is deactivated. In accordance with the sensed revolutions of drum 30, write head W1 is activated every other drum revolution. When activated, write head W1 is supplied with the data from data buffer 56 which results in a series of flux transitions being written along the track.

Figure 9A:
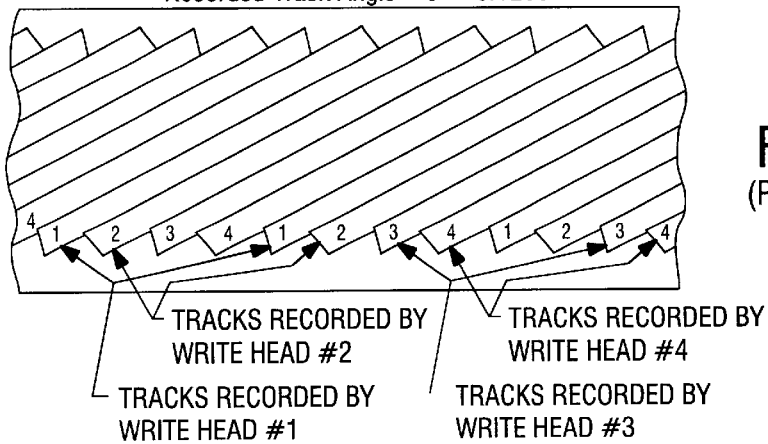
FIG. 9A is a diagrammatic view of a track pattern on a normal tape for a helical scan drive having four write heads and four read heads.
Figure 9B:
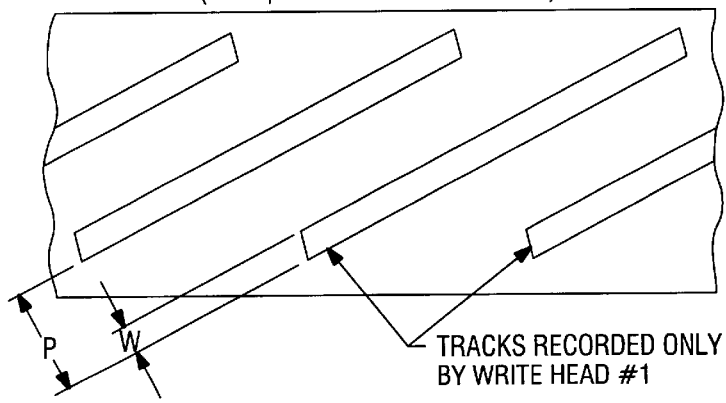
FIG. 9B is a diagrammatic view of a track pattern on a single-scan master alignment tape for the helical scan drive which reads the normal tape of FIG. 9A.
Figure 9C:
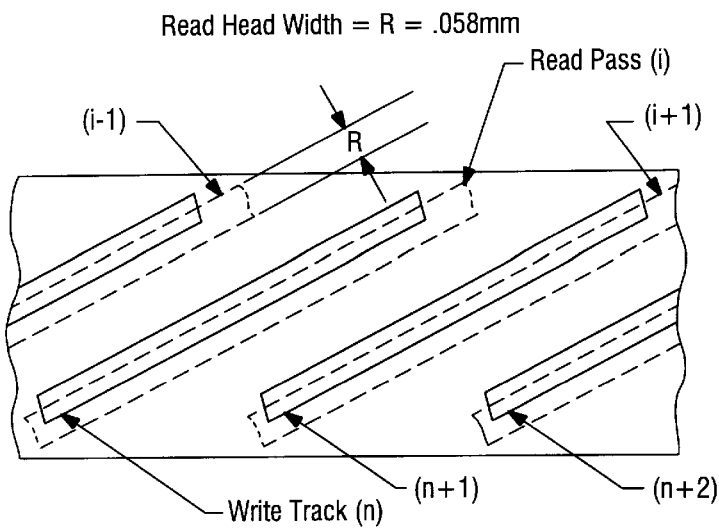
FIG. 9C is a diagrammatic view showing a path of an activated read head over the single-scan master alignment tape of FIG. 9B.
Figures 10, 11:
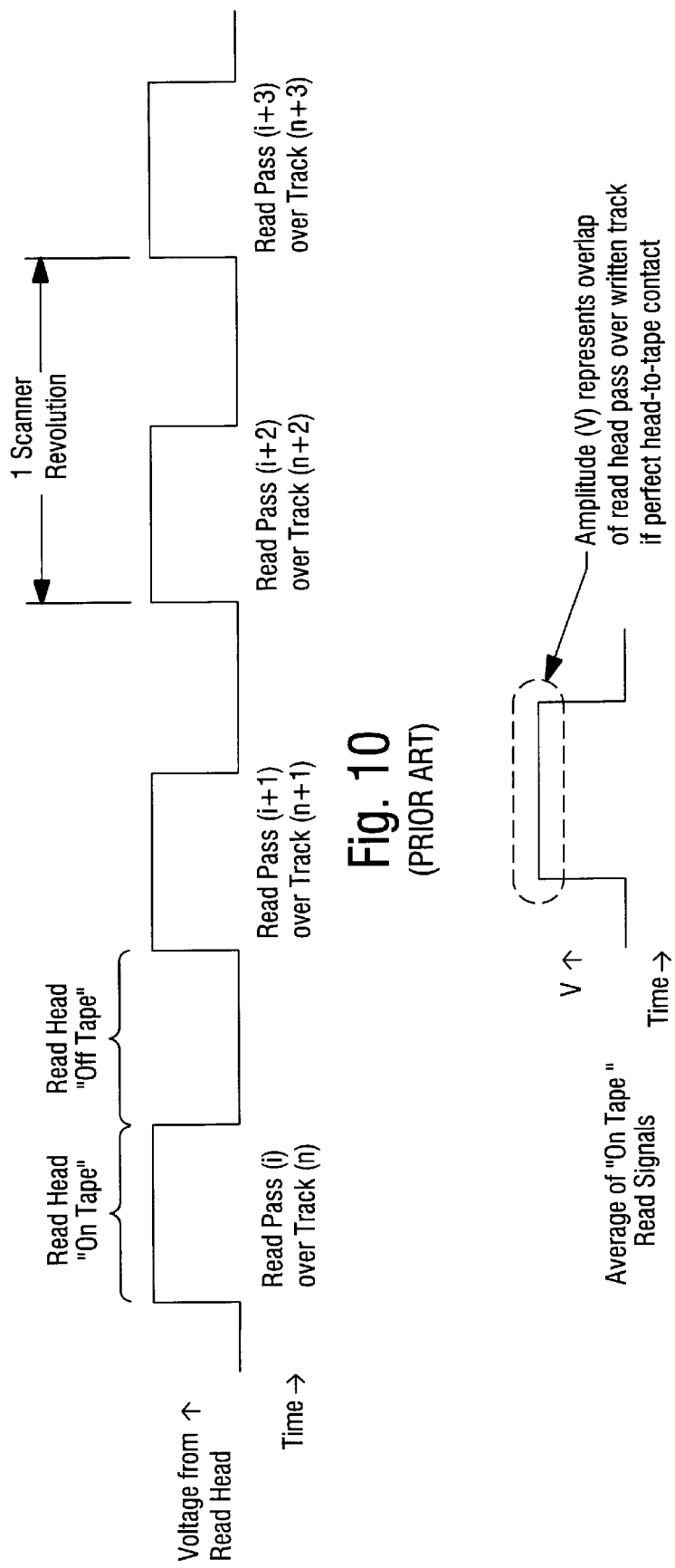
FIG. 10 shows a signal waveform for from a read head following a single-scan master alignment tape.
FIG. 11 shows an averaging of voltage waveforms from many on-tape read scans of single-scan master alignment tape.

What is recorded on the dual-scan master calibration tapes of the present invention is a mid-band "tone" or frequency which is rich in flux transitions. Calibration tape 10A, which is read by the helical scan drive of FIG. 5, has flux transitions occurring in a range of between 6 MHZ and 20 MHZ, and preferably 13.25 MHZ. Calibration tape 10B, on the other hand, as described in FIG. 9A–FIG. 9C, has flux transitions occurring between 6 MHZ and 20 MHZ, and preferably 8 MHZ.

In utilizing the dual-scan master calibration tape 10A in a tape drive to be adjusted, one read head (e.g., read head R1) is utilized to read the tracks recorded on tape 10A. The tape drive is operated so that read head R1 reads twice each track recorded on the dual-scan master calibration tape in the manner shown in FIG. 2A. The signal read from read head R1 is obtained on line RS. The value of the signal on RS is applied to waveform reading machinery.

One example of waveform reading machinery is oscilloscope 100, illustrated in FIG. 6. Oscilloscope 100 includes a peak detector 101 and an analog to digital converter (ADC) 102. As one example, oscilloscope 100 can be a Tektronics TDS 460A Digital Oscilloscope. The signal voltage waveforms over time for dual-scan master calibration tape 10A herein illustrated are indicative of the signal outputted by peak detector 101 at point 103 (signal voltage waveforms over time for other embodiments are likewise represented by comparable peak detection outputs). After digital conversion, the signals are applied to a computer 105. Computer 105, using software such as that marketed as "LabView", performs the averaging to obtain average values, uses the average values to perform the A–B calculations, and drives an output display to provide an illustration indicative of values such as those shown in the bottom half of FIG. 3. Using these displayed values, the guide elements 700 can be properly adjusted.

The present invention provides an improved process for the adjustment and alignment of any tape drive using a rotary scanning head device (e.g., helical, transverse, or arcuate) for magnetic recording. This improved process, consisting of a specially generated dual-scan master alignment tape used in conjunction with a particular readback method, has increased sensitivity and reduces the influence of head/tape contact effects thereby improving the accuracy of the tape drive alignment which is based on readback signal amplitudes.

The technique of the present invention has distinct advantages over the prior art method. For example, the present invention has better sensitivity since the voltage change of the (A–B) signal per $\mu$m change of overlap is doubled compared to the prior art.

Moreover, the head-to-tape contact effects that influence both the "A" and "B" waveforms are canceled out. Even if head-to-tape problems result in some signal loss, the (A–B) waveform is not affected, and therefore, the drive is not misaligned to compensate for the poor head-to-tape contact. FIG. 4A, FIG. 4B, FIG. 4C, and FIG. 4D illustrate how the (A–B) signal is insensitive to output variations due to head/tape contact that affect the "A" and "B" waveforms equally. In contrast, FIGS. 12A and 12A–1, FIGS. 12B and 12B–1, FIGS. 12C and 12C–1, and FIGS. 12D and 12D–1 illustrate how the single-scan method can be adversely influenced by head-to-tape contact problems.

Figure 4A:
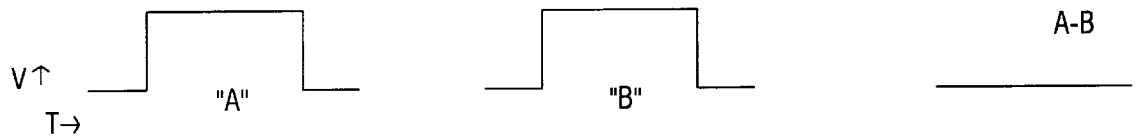
FIG. 4A shows a signal waveform using a calibration tape of the present invention for a case of good alignment and good head-to-tape contact.
Figure 4B:
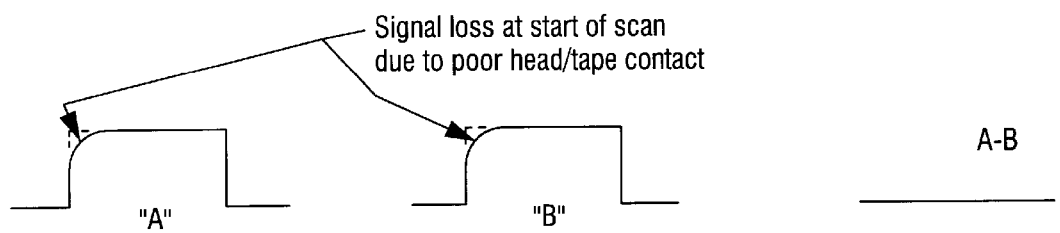
FIG. 4B shows a signal waveform using a calibration tape of the present invention for a case of good alignment and poor head-to-tape contact.
Figure 4C:
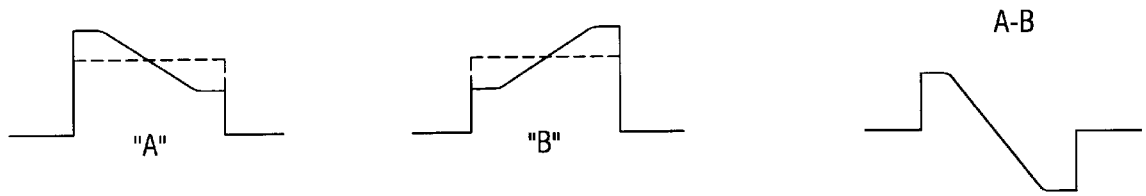
FIG. 4C shows a signal waveform using a calibration tape of the present invention for a case of poor alignment and good head-to-tape contact.
Figure 4D:
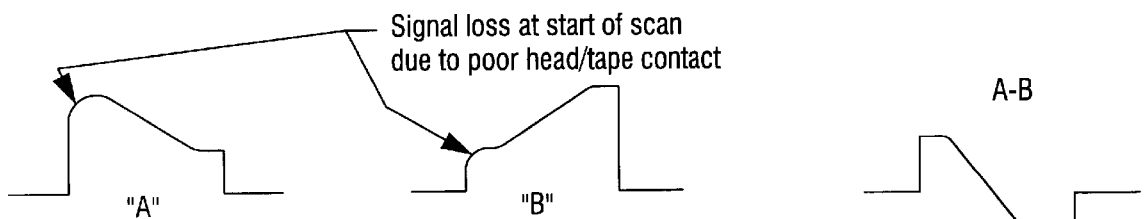
FIG. 4D shows a signal waveform using a calibration tape of the present invention for a case of poor alignment and poor head-to-tape contact.

FIG. 4A shows a case of good alignment and good head-to-tape contact. FIG. 4B shows a case of good alignment and poor head-to-tape contact. FIG. 4C shows a case of poor alignment and good head-to-tape contact. FIG. 4D shows a case of poor alignment and poor head-to-tape contact. Note that the alignment as represented by the A–B waveform is unaffected by the condition of the head-to-tape contact.

Although the invention has been described using helical-type rotary head tape drives, it can also be applied to transverse-type and arcuate-type rotary head tape drives.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A method of determining a calibration indicia for use in adjusting guide elements of the helical scan magnetic tape drive, the method comprising:

using a master calibration tape having a plurality of helical tracks pre-recorded thereon;

transporting the master calibration tape past a read head mounted on a rotatable drum of the tape drive in a manner whereby, for a track pre-recorded on the master calibration tape, the read head separately follows a first path over the track and a second path over the track, the master calibration tape having a plurality of helical tracks pre-recorded thereon but only at every other revolution of the drum;

generating a first path read signal as the read head follows the first path over the track;

generating a second path read signal as the read head follows the second path over the track; and using a difference of the first path read signal and the second path read signal to determine the calibration indicia for the tape drive.

2. The method of claim 1, wherein the method further comprises:

generating the first path read signal and the second path read signal for each of the pre-recorded tracks on the master calibration tape;

determining an average first path read signal and an average second path read signal;

using the average first path read signal and the average second path read signal to determine a calibration indicia for the tape drive.

3. The method of claim 1, wherein the first path over the track occurs over a first longitudinal edge of the track and the second path over the track occurs over a second longitudinal edge of the track.

4. The method of claim 1, wherein the step of transporting the master calibration tape past the read head includes rotating the drum as the master calibration tape is transported therepast.

* * * * *